United States Patent [19]

Pasco et al.

[11] 4,246,215
[45] Jan. 20, 1981

[54] METHOD FOR FIRING LOW DENSITY GRAPHITE/ALUMINA COMPACTS AND CORES

[75] Inventors: Wayne D. Pasco, Ballston Spa; Frederic J. Klug, Amsterdam; Marcus P. Borom, Schenectady, all of N.Y.

[73] Assignee: General Electric Company, Schenectady, N.Y.

[21] Appl. No.: 46,118

[22] Filed: Jun. 6, 1979

[51] Int. Cl.³ .............................................. C04B 15/14
[52] U.S. Cl. ...................................... 264/64; 264/65; 264/82
[58] Field of Search ...................... 264/64, 65, 82, 60

[56] References Cited

U.S. PATENT DOCUMENTS

| | | | |
|---|---|---|---|
| 2,983,022 | 5/1961 | Dressler et al. | 264/64 |
| 3,242,241 | 3/1966 | Schepers | 264/65 |
| 3,438,729 | 4/1969 | Ohlgren | 264/65 |
| 3,487,135 | 12/1969 | Hassler | 264/64 |
| 3,531,308 | 9/1970 | Bagley | 264/64 |
| 3,538,202 | 11/1970 | Bidard | 264/65 |

Primary Examiner—Donald J. Arnold
Attorney, Agent, or Firm—Jane M. Binkowski; James C. Davis, Jr.; Leo I. MaLossi

[57] ABSTRACT

A method of firing alumina-based ceramic core compacts includes firing the compact in a controlled atmosphere in a closed retort whereby at least a portion of the gas of the controlled atmosphere is caused to flow down, around and through the porous compact by aspiration.

9 Claims, 6 Drawing Figures

METHOD FOR FIRING LOW DENSITY GRAPHITE/ALUMINA COMPACTS AND CORES

RIGHTS GRANTED TO THE UNITED STATES OF AMERICA

The Government of the United States of America has rights in this invention pursuant to Contract No. F33615-77-C-5200 awarded by the Department of Defense.

BACKGROUND OF THE INVENTION

1. Field of Invention

This invention relates to a method of firing of cores made of low density graphite/alumina mixtures and in particular to a method which includes the use of apparatus for enhancing the firing of the cores.

2. Description of the Prior Art

Aluminum oxide cores produced by a process embodying a material mixture of alumina and a reactant fugitive filler mixture requires special treatment during firing to prevent distortion of the cores. The cores are referred to as low density graphite/alumina (LDGA) type cores. The processing of these LDGA type cores requires that close attention must be given to the possible chemical reactions which can occur in the aluminum-oxygen-carbon system during firing of the cores. It has been determined that the initial reaction which takes place during firing of the core is expressed by the following formula:

$$2Al_2O_{3(s)} + 3C_{(s)} \rightarrow Al_4O_4C_{(s)} + 2CO_{(g)}$$

Once the above reaction has taken place, the partial pressure of carbon monoxide, $P_{CO}$, begins to decrease and the $Al_4O_4C$ phase disappears by a chemical reaction which is not understood at this time. The disappearance of the $Al_4O_4C$ phase can only occur if the $P_{CO}$ is $\leq 0.1$ atmosphere. It is for this reason that it is important that the flow of the ambient furnace gas be as uniform as possible about the core during firing.

To date, microstructural examination of fired core cross-sections have revealed more pronounced density gradients on core surfaces exposed to the furnace atmosphere than on core surfaces in contact with the core setter. The examination and conclusions drawn therefrom indicates that the $Al_2O$ gas formed by decomposition of $Al_4O_4C$ was condensing to form $Al_2O_3$ preferentially on the exposed core surfaces. Consequently, the cores became distorted during the firing process.

It is therefore an object of this invention to provide a new and improved method of firing low density graphite/alumina core compacts to achieve a good gas flow about and through the porous structure of the compact.

Another object of this invention to provide new and improved method which includes the use of a novel setter design for supporting low density graphite/alumina cores and enhancing reaction product removal during firing.

Another object of this invention is to provide new and improved method for firing low density graphite/alumina cores wherein good turbulent gas flow is achieved over substantially all of the surface areas of the core.

Other objects of this invention will, in part, be obvious and will, in part, appear hereinafter.

BRIEF DESCRIPTION OF THE INVENTION

In accordance with the teachings of this invention there is provided a method for firing low density graphite-alumina ceramic core compacts. The method includes the process of disposing the compact in a controlled atmosphere. The atmosphere is hydrogen having a dewpoint of $-80°$ F. and preferably of $\sim -100°$ F. The compact is heated at a controlled rate of about 300° C. per hour to the firing temperature where isothermal heating is continued until the firing of the compact is completed.

A first portion of a gas of the controlled atmosphere is directed to impinge upon the upper surface of the compact. A second portion of the gas of the controlled atmosphere is directed to flow beneath the lower surface of the core compact. The flow of the second portion aspirates a part of the first portion to cause that part to flow about and through the porous compact structure to enhance the removal of reaction products produced during firing.

A firing is preferably practiced in a closed retort wherein the compact is disposed on a setter placed therein. A major surface of the setter is configured to match the lower surface of the compact. An array of intersecting channels are formed in the major surface and extend a distance therefrom less than the thickness of the setter. A portion of some of the channels intersect an aperture extending entirely through the setter. The second portion of the gas of the controlled atmosphere is caused to flow through the aperture to achieve the aspiration effect and to enable the flowing of gas about the lower surface of the compact.

The dewpoint of the hydrogen caused to flow through the closed retort may have a different dewpoint level that of the hydrogen atmosphere of a furnace in which the retort is placed during firing.

DESCRIPTION OF THE INVENTION

Figure 1:
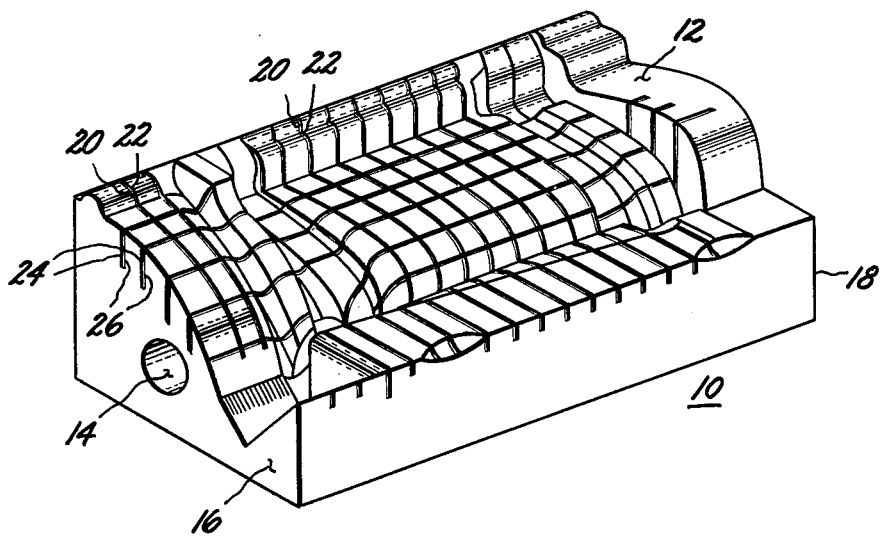
FIG. 1 is an isometric view of a setter.
Figure 2:
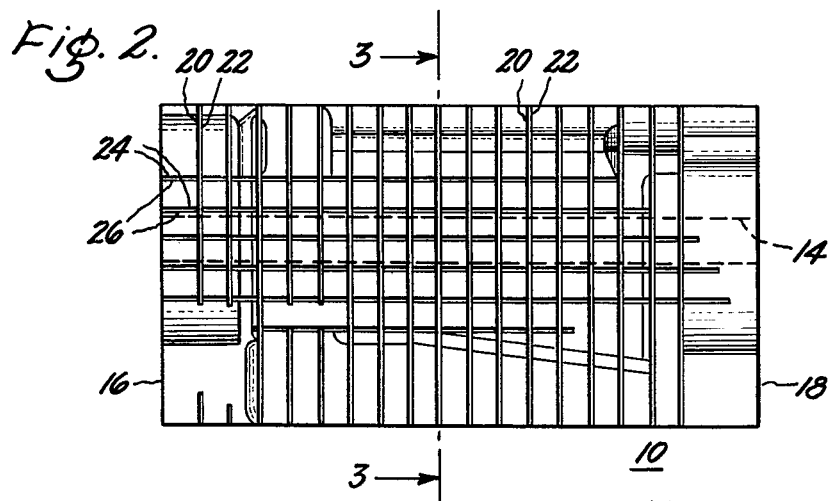
FIG. 2 is a top planar view of the setter.
Figure 3:
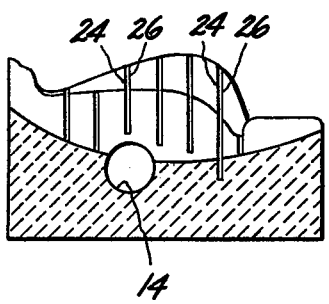
FIG. 3 is an cross-sectional view of the setter taken along cutting plane 3—3 of FIG. 2.
Figure 4:
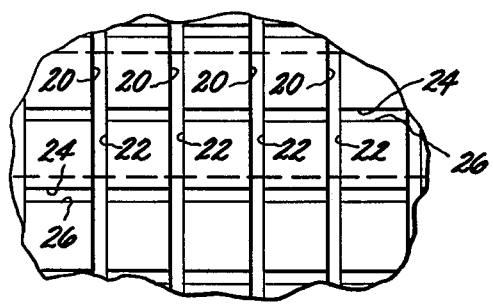
FIG. 4 is an enlarged top planar view of the setter.

Referring to FIGS. 1, 2, 3 and 4 there is shown a core setter 10 employed for firing low density graphite/alumina (LDGA) cores. The top surface 12 of the setter 10 is configured to match the contour of the surface of the core placed on the setter 10 for firing. The material of the setter 10 has a coefficient of thermal expansion which closely matches that of the core fired thereon. Preferably, the material is the same as that of the core after firing to minimize thermal expansion mismatch. In this instance the material of the setter 10 is alumina.

Wall 14 defines an aperture which extends the entire length of the core setter 10 from one end surface 16 to the other end surface 18. The axis of the aperture is substantially parallel with the longitudinal axis of both the setter 10 and a core which is supported by the surface 12 of the setter 10.

A plurality of pairs of walls 20 and 22 define a plurality of first grooves which are oriented substantially perpendicular to the wall 14 and the longitudinal axis of the setter 10. The first grooves intersect the aperture providing a path for gas flow to and from the aperture. A plurality of walls 24 and 26 define a plurality of second grooves which are oriented substantially parallel to the longitudinal axis of the setter 10 and the aperture. The second grooves intersect the first grooves but do not intersect the aperture.

Figure 5:
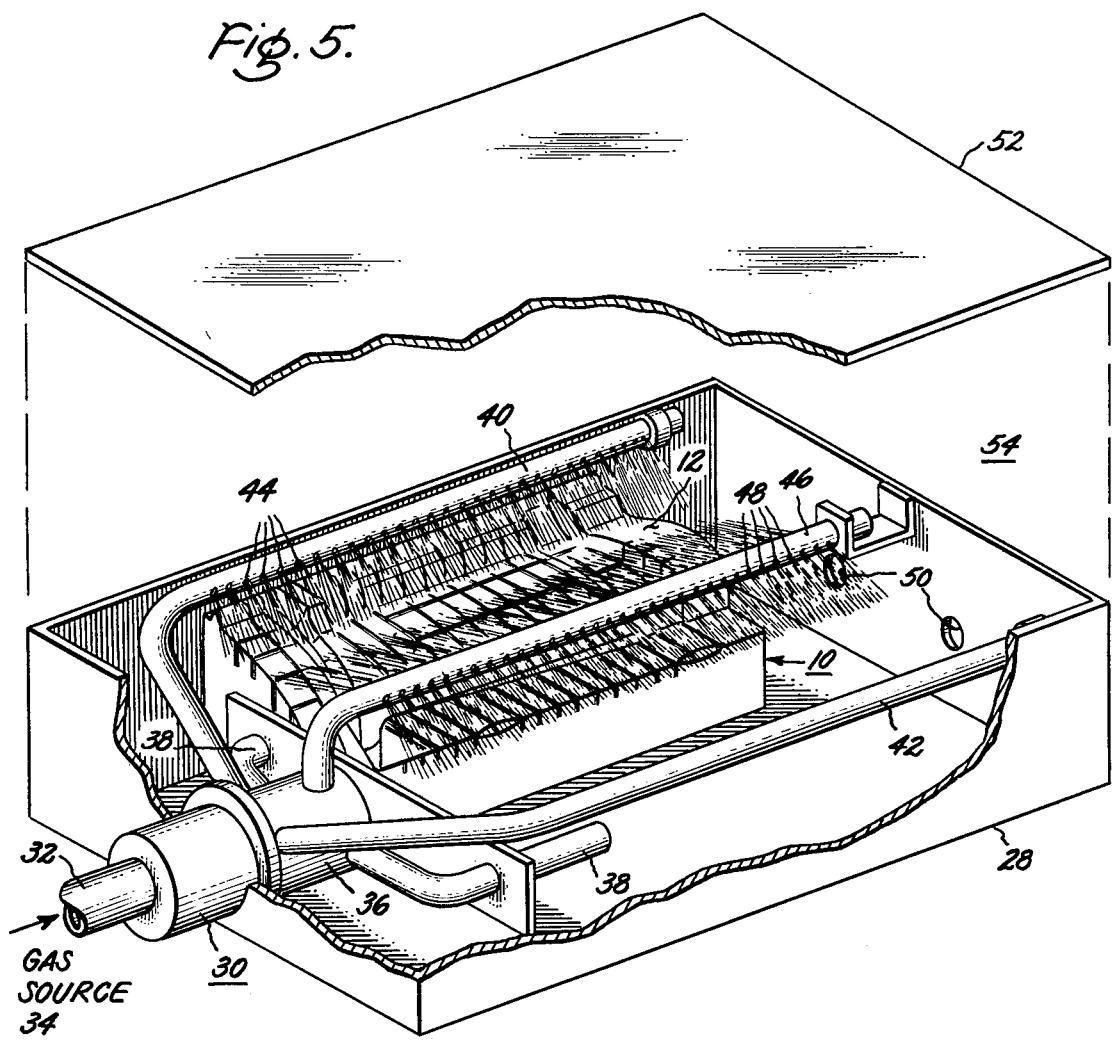
FIG. 5 is an isometric view of a setter in a retort.
Figure 6:
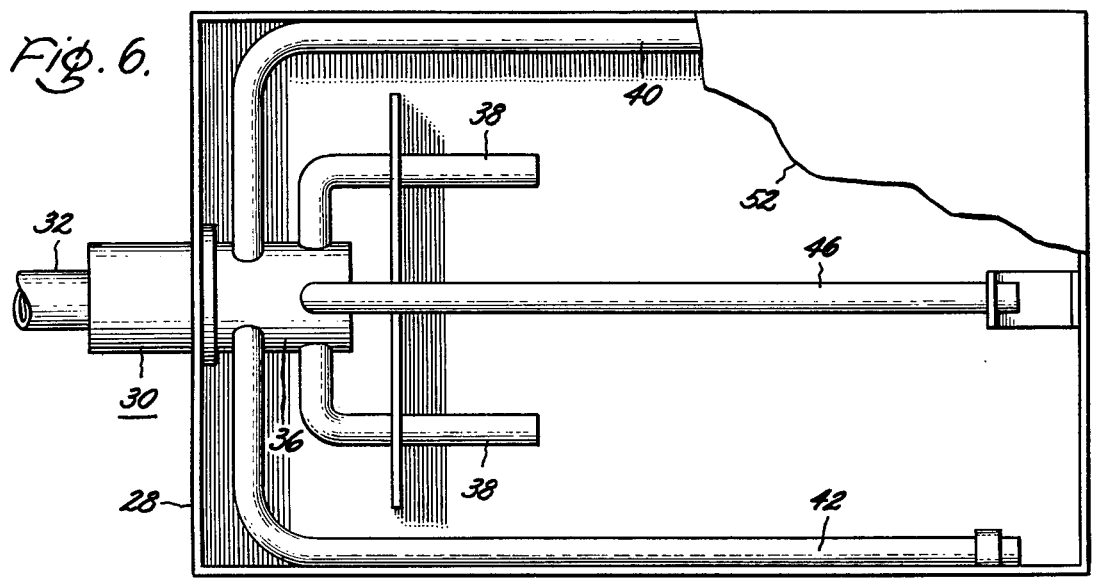
FIG. 6 is a top planar view of a retort.

With reference to FIGS. 5 and 6, the setter 10, with a core, not shown, disposed thereon, is placed in a box or retort 28 made of a material such, for example, as molybdenum or tungsten, which will withstand temperatures of about 2000° C. for periods of 4 or more hours in the furnace atmospheres anticipated. A gas distribution means 30 is provided in the box 28 for distributing the gas, which forms the firing atmosphere, in a preferred manner.

The gas distribution means 30 comprises an inlet tube 32 for introducing the gas from a gas source 34 to a manifold 35 located within the box 28. Alternately, the manifold 36 may be located outside the box 28. At least one first distribution tube 38 is connected to the manifold 36 and is inserted into aperture opening in either one of the ends 16 or 18 of the setter 10. Second and third dead ended distribution tubes 40 and 42 are each connected to the manifold and oriented to lie above and oriented substantially parallel to, and spaced from, one longitudinal edge of the setter 10, each tube 40 and 42 has a plurality of spaced openings defined by walls 44 for directing the flow of gas into the box 38 and preferably towards the surface 12 of the setter 10 and the core disposed thereon. A fourth dead ended distribution tube 46 is preferably connected to the distribution manifold 36 and oriented to lie above, between and substantially parallel to two mutually adjacent setters 10. Walls 48 define a plurality of apertures which direct the flow of gas into the box 28 and toward each of the surfaces 12 of the two mutually adjacent setters 10. Walls 50 define apertures which permit the venting of the firing atmosphere from the box 28 during the firing process.

A cover 52 preferably made of the same material as the box 28, is provided to maintain within the retort a controlled firing atmosphere which is independent of the furnace atmosphere. The cover 52 and box 28 form retort 54 for firing the cores on the setter 10.

During the process of firing the core, the gas such, as dry hydrogen, is caused to flow through the inlet tube 32 from the gas source 34 into the manifold 36. Within the mainfold, the gas is caused to flow in part through the first distribution tubes 38 and through the aperture of the setter 10. The remainder of the gas from the source 34 is split and caused to flow substantially equally through the second, third and fourth distribution tubes 40, 42 and 46 respectively and being expelled therefrom through the respective plurality of apertures directed toward the surface 12 and the core being supported and fired thereon.

The other end of the aperture in the setter is open to the interior of the furnace or retort 54. The gas flowing through the first inlet tube 38 and each aperture of a core acts as an aspirator for the gas injected into the enclosed retort 54 by the tubes 40, 42 and 46. The aperture in the one end of the box 28 of the retort 54 vents and restricts the outflow of gas to provide a positive gas pressure in the retort 54.

It is believed that the gas flowing through the aperture of each setter 10 acts as an aspirator. The aspiration effect produced causes the gas directed toward a core supported by the surface 12 to flow about and through the porous structure of the core being fired and through the plurality of channels to the aperture of the setter thereby effectively removing the gaseous reactant products emitted from the core during the firing sequence.

In the firing of graphite-alumina cores, it is imperative that the firing sequence prevent the development of a non-uniform density gradient on the surface of the core. The surface non-uniformity is an indication of non-uniform densification which may result in cracking of the core and excessive core warpage. Drag caused by shrinkage during the firing sequence must also be prevented. The prevention of atmospheric oxidation of carbon prior to its reaction with $Al_2O_3$ is also essential. Control of carbon oxidation during processing governs total firing shrinkage since shrinkage is dependent on the amount of carbon available for direct reaction with alumina. Non-uniform, atmospheric oxidation of carbon will result in differential shrinkage of the core. Avoidance of non-uniform oxidation of subsequent differential shrinkages is complicated by the fact that the thickness of the core may vary from 0.5 mm to ~6 mm. The use of ultra dry hydrogen, that is hydrogen having <10 ppm $H_2O$, minimizes the oxygen source, e.g. $H_2O$, thus minimizing differential shrinkage.

The novel design of the setter 10 and retort 54 enables one to achieve rapid, uniform removal of the reaction products which evolve as a result of the reactions between $Al_2O_3$ and C. This is an essential feature. As the $Al_4O_4C$ phase disappears, the aluminum suboxides, either $Al_2O$ or $AlO$, and CO subsequently form. A portion of the gaseous aluminum suboxides evolve from the core while a portion condenses near the external surface to produce a density gradient which serves as a surface barrier layer. If the gas surrounding the core should be stagnant, the $P_{CO}$ will rise and the aluminum suboxides will not form. This situation may result in differential shrinkage as well as differential formation of the density gradient which serves as the barrier layer to metal penetration. With the new setter 10 and retort 54 the microstructure of the core is better controlled and distortion is essentially eliminated by minimizing the non-uniform oxidation of carbon while enhancing the removal of the reaction products.

The following examples are illustrative of the teachings of this invention:

EXAMPLE I

An open molybdenum boat was fabricated and a bed of −20 mesh alumina was laid in the bottom of the boat. A A graphite-alumina core was placed on the bed of alumina and more alumina was packed around it. A thickness of at least 3 centimeters of alumina encased the core.

The boat with the core was placed in a controlled atmosphere furnace. The furnace atmosphere was hydrogen having approximately a +20° F. dewpoint.

The furnace atmosphere was initially purged with nitrogen and then the hydrogen atmosphere was introduced. A heating rate of about 300° C. per hour was practiced until 1780° C.±5° C. was reached. When maximum temperature had been reached, the core was isothermally heated for another two hours and, subsequently, furnace cooled to room temperature. The boat and core were withdrawn from the furnace and the core removed from the alumina for examination.

Visual examination revealed the core to be too distorted for commercial use. The core was bowed, U-shaped serpentines sections exhibited greater shrinkages than straight through sections. In the design of the core there is a T-bar section and this was distorted also.

EXAMPLE II

A binder system was prepared which included a paraffin base consisting of 33⅓ parts by weight each of paraffins P-21 and P-22 and ceresin C-245, each of which is obtained from Fisher Scientific, Inc. of Fairlawn, N.J. To 100 parts by weight of the paraffin base was added 4 parts by weight of white beeswax, 8 parts by weight of oleic acid and 3 parts by weight of aluminum stearate. To 100 grams of the binder system heated to 95° C.±10° C. was first added 130 grams of 38–900 Alundum ($Al_2O_3$) purchased from the Norton Company of Worchester, Mass. When the $Al_2O_3$ had been wetted and dispersed uniformly throughout, 570 grams of Alundum purchased from the Norton Company was added and mixed for approximately 10 minutes to obtain a uniform mixture.

A precision machined, inverse contoured pattern of the core was used to form the contoured surface of the alumina setter. The hot material mixture was poured into the mold and vibrated for about 30 seconds to assure good wetting of mold surfaces by the material mixture. The setter casting was cooled to room temperature and removed from the mold.

The setter casting was placed on a bed of Vulcan XC-72 graphite packing powder, purchased from the Cabot Corporation of Boston, Mass., the bed being from 2 centimeters to 3 centimeters deep. A sufficient amount of the same graphite powder was then poured on top of the setter casting to ensure a depth of a layer of from 2 centimeter to 4 centimeter of graphite powder over the setter. The graphite powder was compacted lightly by hand to achieve intimate contact with the setter.

The graphite covered setter casting was placed in an air circulating oven and heated at about 5° C./hour to about 160° C.±5° C. The elevated temperature was maintained for approximately 24 hours to cause the binder system to be withdrawn from the setter casting by capillary action of the graphite powder. The setter casting was removed from the furnace and cooled to room temperature. The setter casting was then removed from the graphite packing powder and loose powder removed therefrom with a soft bristle paint brush.

The setter casting was then placed in an air atmosphere furnace and heated at a rate of about 25° C./hour to about 400° C. The heating rate was then increased to about 50° C./hour and the casting heated to about 1500° C.±10° C. The casting was maintained for about 1 hour at 1500° C.±10° C. and then furnace cooled to room temperature or slightly above.

A dewaxed graphite-alumina core was placed on the surface of the setter configured to match the final fired surface of the core. The core and setter was placed in an open molybdenum retort in a controlled atmosphere furnace. The atmospheric gas was dry hydrogen having a dewpoint of $\sim -100°$ F.

The furnace and the retort was purged thoroughly with nitrogen and the hydrogen gas was then introduced into the furnace and the boat. Purging was continued for a minimum of 4 hours after which the firing cycle ramp was commenced. Firing was conducted at a rate of $\sim 300°$ C. per hour to 1780° F.±5° C. where the core was isothermally heated for two hours. The core was furnace cooled to room temperature and then removed from the furnace for examination.

Visual examination showed that a small amount of distortion still persisted. The minor distortion appeared as an upward bowing of the core away from the core setter. The U-shaped serpentines still had greater shrinkage than the straight through sections. The T-bar section had now developed a slight inward curvature as well as an upward bowing. Microstructural examination of cross-section of the core revealed a more pronounced density gradient on the up-side of the core, that is on the convex side of the air foil portion furthest away from the core setter.

The core was unacceptable for commercial use.

EXAMPLE III

The procedure of Example II was again practiced except for the following:

The molybdenum boat was modified to provide an improved gas flow over both the convex side and the concave side of the core. Two long, closed-end molybdenum tubes were oriented to run the length of the boat along the top edge thereof. A plurality of holes were drilled in each tube in order to direct the gas flow emerging from the holes downwardly at an angle toward the core. This permitted direct gas impingement on the convex side of the core to promote removal of reaction products from the core.

A blind hole was drilled along the length of the alumina setter. Shallow cuts were made in the surface on which the core is disposed. The cuts intersected the drilled hole. A molybdenum tube, having several holes drilled into it, was inserted all the way into the drilled hole in the setter. The function of this molybdenum tube was to dispense flowing hydrogen gas to the concave side of the core during firing.

The firing cycle of the core was again practiced in accord with the cycle practiced in Example II.

Examination of the core revealed that gas-induced erosion of both the setter and the core had occurred at all locations where a hole in the molybdenum tube, which was inserted in the setter was in close proximity to a cut or slot in the setter.

The core was unacceptable for commercial use.

EXAMPLE IV

The procedure of Example III was again practiced with the exceptions that:

(1) The hole was drilled entirely through the setter and a new molybdenum feeder tube fabricated without holes therein and of a length sufficient to barely extend into the drilled hole of the setter. This modification was made to provide a straight through gas flow and to achieve an aspirating affect.

(2) A second set of saw cuts, or slots, were made in the surface that intersected the original saw cuts, or slots, at approximately 90° C. Each of the saw cuts, or slots, were aligned substantially parallel with the longitudinally axis and the drilled hole of the setter. However, none of these second saw cuts, or slots, in the vicinity of the drilled hole, were deep enough to intersect the drilled hole. A cover was provided for the boat to provide a closed boat or retort. Exit holes were provided in the end of the retort opposite the gas inlet end.

Examination of the components after firing revealed that no gas induced erosion had occurred on either the core or the setter. Furthermore, the core fired on the modified setter exhibited minimal distortion and shrinkages for all sections and met engineering requirements.

The core was acceptable for commercial applications.

The dimensions of the cores fired on the novel setter are such that the drill through hole in the setter is ¼ inch in diameter. The saw cuts, or slots, are about ¼" apart and perpendicular to the opposed major surfaces of the setter and the drilled hole.

Preferably, the hydrogen gas flow is arranged so that the total flow through the drilled hole of one or more setters is about one-third the total flow of the hydrogen flow through the retort. Therefore, approximately two-thirds of the total hydrogen flow is through the elevated closed end tubes which run parallel to and above the longitudinal axis of the one or more core setters. The hydrogen exits from the apertures of the elevated tubes, is directed downward toward, around and through the porous core with some of it being removed by the aspiration effect of the gas flow through the drilled hole of the setter. This gas flow arrangement provides an excellent means to remove the reaction products of core found during firing of the core.

Excellent results are achieved when cores are fired in a furnace having a controlled atmosphere of flowing hydrogen having a dewpoint of +20° F. while the hydrogen gas flowing into and through the closed retort is maintained at a dewpoint of < −80° F. This is achieved by having two separate hydrogen supplies, one for the furnace and one for the closed retort.

We claim as our invention:

1. A method for firing a ceramic compact to produce at least a substantially distortion-free ceramic consisting essentially of:
    (a) disposing a porous alumina-based compact having upper and lower surfaces and comprising a ceramic material and a reactant fugitive filler material selected from the group consisting of elemental carbon and a carbon-bearing material in a controlled gaseous atmosphere of hydrogen having a dewpoint less than −30° F.;
    (b) heating the compact to an elevated temperature to fire the compact;
    (c) directing a first portion of said gaseous atmosphere to impinge directly on the upper surface of the compact;
    (d) simultaneously passing a second portion of said gaseous atmosphere beneath the lower surface of the compact;
    (e) aspirating a part of the flow of said first portion of said gaseous atmosphere as an effect of the flow of the second portion of said gaseous atmosphere to cause a part of the flow of said first portion of gaseous atmosphere to be directed about and through the porous structure of the compact to remove sufficient reaction products therefrom to produce said substantially distortion-free ceramic.

2. The method of claim 1 wherein
the hydrogen gas has a dewpoint of less than ∼ −80° F.

3. A method for firing an alumina-based ceramic core compact containing a reactant fugitive filler material to produce at least a substantially distortion-free ceramic core consisting essentially of:
    (a) depositing an alumina-based porous core compact containing a reactant fugitive filler material selected from the group consisting of elemental carbon and a carbon-bearing material in a closed retort;
    (b) heating the compact and retort to firing temperature in a controlled atmosphere of hydrogen having a dewpoint less than −30° F.;
    (c) directing a first portion of said hydrogen to impinge directly on the upper surface of the compact;
    (d) simultaneously passing a second portion of said hydrogen beneath the lower surface of the compact;
    (e) aspirating a part of the flow of the first portion of said hydrogen as an effect of the flow of the second portion of said hydrogen to cause a part of the flow of said first portion of hydrogen to be directed about and through the porous structure of the compact to remove sufficient reaction products therefrom to produce said substantially distortion-free ceramic core.

4. The method of claim 3 wherein
the controlled atmosphere is hydrogen having a dewpoint of no greater than −80° F.

5. The method of claim 4 wherein
the dewpoint is ∼ −100° F.

6. The method of claim 3 including the additional process step of
placing the compact on a setter in the retort, the setter having a major surface configured to conform to the lower surface of the compact and having an array of spaced intersecting channels which extend into the setter from the major surface less than the thickness of the setter, at least a portion of some of the spaced channels intersecting an aperture which extends entirely through the setter from one end thereof to the other end, and wherein
the second portion of said hydrogen is passed through the aperture of the setter to cause a part of the first portion of said hydrogen to flow about and through the porous compact and through the array of channels, and a portion of this hydrogen is also caused by aspiration to join with the second portion of said hydrogen passing through the aperture.

7. The method of claim 6 wherein
the reactive fugitive filler material is carbon, or a carbon-bearing material,
the gas of the controlled atmosphere is hydrogen having a dewpoint of not greater than −80° F.

8. The method of claim 6 wherein
the retort is placed in a furnace having an atmosphere of hydrogen having a dewpoint of +20° F.,
and the controlled atmosphere in the retort is hydrogen having a dewpoint of <100° F.

9. The method according to claim 1 wherein said elemental carbon is graphite.

* * * * *